Patented Mar. 28, 1944

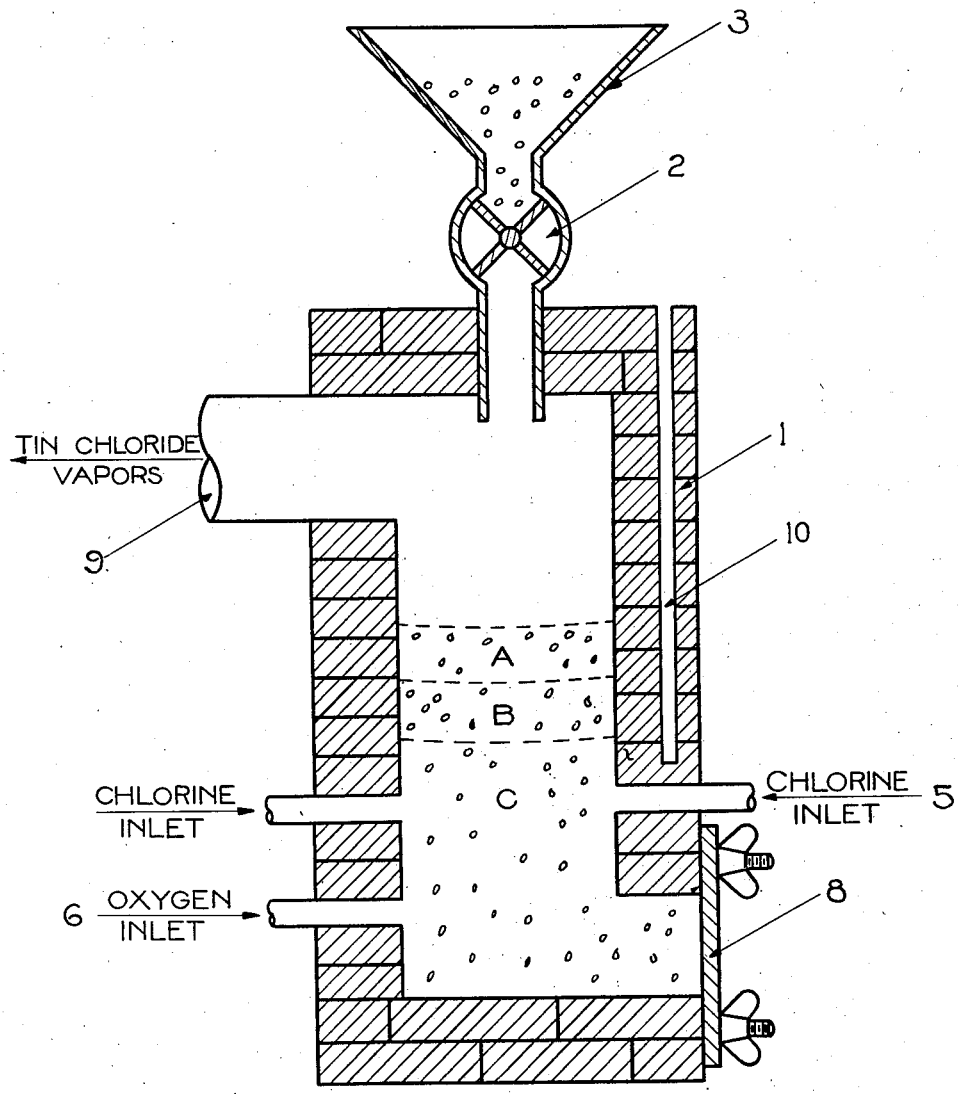

2,345,210

UNITED STATES PATENT OFFICE 2,345,210

TREATMENT OF TIN ORES

Irving E. Muskat, Akron, Ohio, assignor to Pittsburgh Plate Glass Company, Allegheny County, Pa., a corporation of Pennsylvania Application December 27, 1940, Serial No. 371,977

17 Claims. (Cl. 23—98)

This invention relates to a process of chlorinating tin ores. Prior to the present invention, various processes have been used to chlorinate tin bearing materials, particularly tin scrap. In general, such processes have involved the chlorination of the ore at low temperatures in order to produce liquid stannic chloride. Such processes are not generally suitable for the treatment of tin bearing ores. Attempts to chlorinate ores at higher temperatures have been generally unsuccessful, particularly since reactors constructed from heat conductive materials have been required in order that the reacting materials might be heated to the desired temperature by means of suitable furnace heating elements. Such reactors are very readily attacked by the chlorination agent at the temperature of chlorination and in consequence, processes involving the chlorination of tin ores have been considered impractical.

In accordance with my invention, I have found that tin ores may be chlorinated without recourse to externally heated reactors and that such processes may be conducted in a furnace of refractory construction which is resistant to the attack of chlorinating agents at the temperature of treatment. I have found that by conducting the chlorination in a reactor constructed of refractory heat insulating material and at a temperature sufficiently high, it is possible to so regulate the rate of reaction of ore and chlorine as to make external heating of the furnace unnecessary. Thus, if the temperature of reaction is maintained at not less than 500° C., and preferably in excess of 800° C., it is possible to increase the rate of reaction to such an extent that the heat evolved will maintain the reaction temperature without use of an externally heated reactor. On the other hand, treatment of ores at temperatures below 500° C., does not appear to be feasible for most purposes due to the relatively slow reaction of the ore. In order to improve the chlorine utilization and general efficiency of the process, control of the depth of ore bed and location of the zone of major reaction within the bed are found desirable as more fully discussed hereinafter.

The process is particularly important and advantageous since it permits the treatment of comparatively low grade concentrates containing 10 percent or even less of tin. Moreover, the process permits the treatment of ores which contain such impurities as arsenic, antimony, lead, copper and sulphur for the production of substantially pure stannic chloride. Prior to the present invention, ores containing such impurities have been found to be particularly difficult to treat and in many cases the treatment has been so expensive that the recovery of tin from ores containing large quantities of such impurities has been considered unfeasible. The present process is capable of treating ores containing these impurities in a more economical manner than is possible in other processes.

The process is preferably conducted in the presence of a reducing agent such as carbon, methane, acetylene, ethane or other solid, liquid or gaseous carbonaceous material, or other reducing agents such as sulphur or sulphides. In some cases, particularly in treating ores containing a substantial quantity of sulphides the use of the reducing agent may be eliminated. The quantity of reducing agent required is dependent upon the composition of the ore and the quantity of reducing agents such as sulphur which may be present therein. Generally, the reducing agent concentration utilized is 2 to 20 percent of the weight of the ore undergoing treatment. On the other hand, it is often possible to eliminate the use of reducing agents provided the ore contains sufficient amounts of easily chloridizable materials to permit the maintenance of the reaction without external heating.

In order to assist the reaction, air or oxygen may be introduced. In such a case the amount of carbon, if present, may be increased in order to compensate for the consumption of some of the carbon by the air introduced. Often the introduction of air or oxygen and carbon or other combustible carbonaceous, sulphurous or similar material is desirable in order to assist in the maintenance of temperature. Moreover, it is found that the presence of air permits a fractional chlorination of the ore whereby the tin is chlorinated while the formation of iron chloride and other metallic chlorides may be minimized. This process permits the use of substantially less chlorine than would otherwise be required. The amount of oxygen introduced is capable of wide variation in accordance with the results desired. Thus, if oxygen is added solely to assist in temperature maintenance, 3 percent or more by volume of oxygen based upon the volume of chlorine added may be utilized. If the oxygen is required to prevent or minimize formation of iron chloride or other chloride, one-half to three volumes of oxygen per volume of chlorine may be desirable. Moreover, the introduction of a substantial quantity of oxygen into the reaction zone often is desirable when HCl is used as a chlorination agent with or without chlorine in order to maintain reaction temperature. In such a case it is often found that the air or oxygen promotes the formation of stannic chloride and minimizes formation of iron chloride, and other chlorides.

The chlorides formed depend to a great degree upon the quantity and character of chlorination agent used. Generally, it is desired to conduct the chlorination to produce stannic chloride and in such case, sufficient chlorine is utilized to insure production of this chloride. On the other hand, if stannous chloride is required the amount of chlorine introduced may be reduced accordingly and often the chlorination may be conducted using other chlorinating agents such as HCl as part or all of the chlorination agent. Generally speaking, a quantity of chlorine slightly in excess of the theoretical is required for production of either stannic or stannous chloride.

During the chlorination a vaporized mixture of various chlorides such as the chlorides of iron, antimony, arsenic and lead or other chlorides are formed. These chlorides may be condensed by various methods. If desired, the chlorides may be fractionally condensed. In many cases, however, it is difficult to secure satisfactory separation of the iron chloride in this manner. Consequently, the iron chloride often distributes itself throughout the condenser system, plugging the system to such an extent that it must be cleaned at frequent intervals. In order to avoid this plugging, it is often desirable to condense the major portion of the iron chloride shortly after it is withdrawn from the furnace. To insure the removal of iron chloride to such an extent that the possibility of plugging during subsequent condensation processes is minimized, it is found desirable to condense out all or a portion, generally not less than about 15–30 percent of the stannic chloride together with the iron chloride. Any residual stannic chloride vapor may then be condensed without fear of plugging the condenser system.

The accompanying drawing diagrammatically illustrates a suitable apparatus for conducting the process in accordance with my invention. The apparatus comprises a suitable shaft furnace 1, which may be constructed from firebrick or other resistant refractory material and which is provided with chlorine tuyères 5, and one or more oxygen tuyères 6, and is connected to a suitable condenser system (not shown). In the ordinary operation of the furnace, a charge of coke or other carbonaceous material may be introduced into the furnace, a blast of oxygen or air introduced through the tuyères 6, and the coke ignited. When the temperature has reached a suitable value, for example, 850° C., a charge of briquettes of ore and carbon may be introduced from hopper 3, by means of a suitable feeding device 2. At this time, introduction of oxygen or air may be discontinued, if desired, and the chlorine introduced into the furnace through tuyères 5. The chlorine flow rate is adjusted in accordance with the amount of ore introduced so that the amount of chlorine introduced is sufficient for complete chlorination. Additions of ore may be either continuous or intermittent. The base of the furnace is provided with a suitable door or other closure 8, at which ash and unchlorinated ore may be withdrawn continuously or intermittently. The iron and tin chlorides which volatilize are withdrawn through outlet 9, and may be led to condensers where they may be condensed by convenient methods. In order to determine the temperature at various levels in the furnace, the furnace may be provided with one or more thermocouple wells 10.

The ore may be chlorinated in a coarse or finely ground state or in the form of briquettes or other suitable forms and may be mixed with more or less carbonaceous materials, such as charcoal, coke, or the like, or if desired, the carbon may be omitted. Preferably, the ore may be ground to minus 100 mesh or finer, and intimately intermixed with finely divided carbon such as peat, petroleum or coal coke, charcoal, etc. These mixtures may then be briquetted prior to chlorination. The briquettes may be bonded with a suitable binder such as molasses, tar, still-residue derived from a distillation of mineral oils, asphalt, bitumen, sodium silicate, hydrated titanium dioxide or stannic oxide, calcium chloride, magnesium chloride, magnesium oxychloride, or other convenient adhesive. When the binder is carbonaceous, a corresponding reduction in the amount of reducing agent introduced into the mixture may be permissible. Care should be taken in forming the briquettes to insure sufficient porosity to permit penetration by the chlorine. The briquettes may be preheated before introduction into the furnace or they may be introduced cold. In general, it is desirable to preliminarily bake the briquettes at a temperature of at least 500° C. in order to eliminate hydrocarbons which may volatilize during the chlorination. If desired, the baked briquettes may be discharged into the furnace from the baking oven and while they are hot.

In starting the process the furnace may be preheated and when it has been heated to a desirable temperature above 500° C., an initial charge of ore may be introduced. Thus, the furnace may be preheated as previously described by introducing coke, peat, or other carbonaceous material into the furnace and sufficient air or oxygen to ignite and burn the carbon or by other suitable method. Thereafter, ore which may contain carbon is introduced upon the burning carbon and chlorine is introduced to initiate the chlorination reaction. Further charges of ore and carbon may be introduced as the reaction proceeds. When the temperature exceeds 500° C., preferably 800° C., it is found that the chlorination reaction occurs with such rapidity and with sufficient evolution of heat that the reaction may be maintained without further introduction of air or oxygen for combustion purposes.

As an alternative method of initiating the reaction, the briquettes or charge of ore with or without carbon or other reducing agent may be heated prior to introduction into the furnace to a temperature above 500° C. and preferably 800–1250° C., and chlorine introduced into the heated charge. In addition, the furnace may be preheated by other methods such as by heating the interior thereof by introducing and burning natural gas or similar gas into the furnace to preheat the furnace to a temperature above 500° C.

In order to keep the process in continuous operation, it is preferred to introduce the ore and carbon or other combustible carbonaceous material, if necessary, and chlorine at such a rate that the temperature is maintained above 500° C., preferably at 800–1250° C. Ordinarily, this may be done by regulating the rate of introduction of chlorine and carbon-ore mixtures of briquettes in accordance with periodic or continuous observation of the temperature in the reactor. Thus, if the temperature begins to decrease, the rate of introduction of the chlorine and of the ore-carbon mixture may be increased, while if the temperature increases, the rate of addition of ore, carbon and chlorine introduced may be decreased. It will also be understood that the temperature may be regulated to some degree by the rate of withdrawal of the chlorinated residue. Thus, a large amount of heat may be dissipated by rapid removal of the residue and the reactor cooled by the incoming cool ore.

Occasionally, the heat developed during the reaction is so great that the temperature of the reaction zone approximates the sintering temperature of the ore. The reaction may be cooled, if desired, by introduction of a diluent gas such as nitrogen or carbon dioxide, or by use of chlorine diluted with these or other diluents. Carbon dioxide appears to be particularly effective as a cooling gas in the reaction. Since substantially uniform results may be secured throughout the range of 800–1250° C., a considerable latitude in temperature regulation may be permissible as long as the temperature remains within this range.

If desired, the chlorination may be conducted in stages. Thus, ore may be given a preliminary treatment with dilute chlorine gas or with HCl or metallic chloride such as calcium or magnesium chloride in order to partially chlorinate the ore. This product which may contain substantial quantities of stannous and/or ferrous chloride may be further chlorinated in the manner described herein.

In order to maintain a uniform rate of reaction and to secure a satisfactory chlorination of the ore, it is often preferred to chlorinate a comparatively deep ore bed. In such a case, it is found that it is possible to secure a more complete chlorination of the ore and utilization of chlorine than would otherwise be possible. Generally the bed is maintained at a depth of at least 12 inches and preferably in excess of 24 inches, measured from the point of introduction of chlorine into the furnace to the top of the bed.

In chlorinating in accordance with the present invention, it is often found that the hottest portion of the reaction is located at the top of the ore bed. This is particularly true when preheated briquettes are used. In such cases difficulty may be encountered in securing high utilization of chlorine and high recovery of tin. Accordingly, it is generally preferred to maintain the hottest portion of the reaction at least about 6 inches below the top of the ore bed. This may be done by periodic observation of the temperature at various levels of the bed as determined by raising or lowering a thermocouple in a thermocouple well located in the furnace well and regulating the conditions of chlorination accordingly. Thus, the level of the hottest portion of the bed may be lowered by reducing the amount of chlorine introduced, by reducing the temperature of the incoming ore, and/or by increasing the rate of ore introduction. Thus, it will be seen that in such a case the ore bed will comprise zones A, B, and C as diagrammatically illustrated in the drawing. When ore is introduced on the top of the bed it contacts a mixture of vaporized halides containing a small quantity of chlorine in a zone illustrated as zone A. During passage of the ore through zone A, chlorination is initiated and chlorine which might otherwise escape from the bed is utilized. Thereafter the ore enters zone B which represents the hottest portion of the reaction bed, where a major portion of the reaction occurs. Finally, ash and partially chlorinated ore enters zone C where the temperature is somewhat lower and where residual unchlorinated ore is contacted with substantially pure incoming chlorine. This permits a further chlorination of the more difficultly chloridizable constituents of the ore, whereby substantially complete removal of the tin in the ore may be secured.

To insure efficient condensation of the vaporized chlorides, it is generally desirable to condense at least 15–30 percent of the tin tetrachloride with the ferric chloride. Under such conditions it is possible to remove the major portion of the ferric chloride from the vapor and thus to prevent or at least minimize plugging of the condenser system. The condensed mixture of chlorides may then be treated to revolatilize the stannic chloride. To insure efficient vaporization of the tetrachloride, this treatment preferably should be conducted by heating the chlorides to a temperature of 100–250° C. in the presence of a gaseous diluent such as nitrogen, chlorine, carbon dioxide, etc., in order to increase the volatility of the stannic chloride. This process has been conducted most efficiently by condensing the chlorides in one portion of a condenser, transferring the condensed mixture of chlorides by scrapers or other suitable means to another portion of the condenser and vaporizing the tetrachloride in the mixture in the presence of the mixture of gases which may contain chlorine, carbon dioxide, and vaporized stannic chloride from which condensed chlorides were obtained initially.

If desired, air or oxygen may be introduced during the condensing operation to oxidize a large portion of the metallic chlorides, leaving the stannic chloride substantially unaffected. This method simplifies the condensing treatment and permits at the same time a high recovery of the chlorine introduced into the furnace.

The following examples are illustrative:

*Example I*

A quantity of briquettes ¼ to ¾ inch in diameter were prepared from a mixture of 100 parts by weight of tin ore containing 36% Sn and 17% Fe, 2 parts carbon and 14 parts by weight of molasses by baking at 600° C. until the volatile hydrocarbons were substantially removed.

A shaft furnace having an internal diameter of 4 inches was preheated by a coke fire within the shaft to 1000° C. A charge of 4 pounds of briquettes and 3 pounds of coke was introduced and an air blast through the shaft maintained for 3 minutes to insure ignition of the added coke. At this time, 10 pounds of briquettes were added and chlorine introduced into the shaft to initiate the chlorination reaction. Chlorine was introduced into the shaft at a rate of 30 liters per minute, while briquettes added at a rate of 10–15 pounds per hour. For a period of over 24 hours the temperature of the reaction mass was very readily maintained at 940° C. to over 1100° C. The vaporized stannic chloride and ferric chloride were collected and fractionally condensed. An ash containing 1.5% Sn and 2.7% Fe was withdrawn from the furnace. Since the quantity of this ash was approximately 25% of the weight of the briquettes added, 98% of the tin content of the ore was volatilized as tin tetrachloride.

Example II

Using a furnace having an internal diameter of 15 inches which was preheated to a temperature of 1000° C., briquettes prepared from a mixture corresponding to 100 parts ore to 5 parts carbon to 14 parts molasses, were introduced at a rate of 120 pounds per hour and the chlorine was introduced at a rate of 2.5 to 3.0 lbs. per minute. The analysis of the ore was as follows: 36.0% Sn, 16.9% Fe, and 5.3% S. The temperature remained at 850–1000° C. throughout the run without externally heating the furnace and the ore bed was maintained at a depth of 3 feet. The hottest portion of the reaction zone was maintained about 5 to 6 inches below the top of the bed. The vapors were cooled and scrubbed with liquid tin chloride at a temperature of 40° C. to 60° C., and the condensed chlorides were transferred to another portion of the condenser where the tin tetrachloride was revolatilized by heating while passing the exhaust gases of the furnace over the condensed chlorides. The vaporized tin chloride was then condensed by chilling in a cold spray of liquid stannic chloride.

Example III

A shaft furnace having an internal diameter of 4 inches was preheated by a coke fire to 1000° C. The reaction was initiated as in Example I. Chlorine was introduced into the furnace at a rate of 8 liters per minute, while air was introduced at a rate of 12 liters per minute, briquettes being added at a rate of 5 to 10 pounds per hour. The ore bed was maintained at a depth of 2 feet. For a period of over 24 hours the temperature of the reaction mass was maintained at 900° C. to 1000° C. The vaporized chlorides were collected, fractionally condensed, and an ash containing 5.5% Sn and 16.7% Fe was recovered, corresponding to a volatilization of 95% of the tin as tin chloride, while only 50% of the iron was volatilized as ferric chloride.

Example IV

An ore containing 18% Sn, 40% Fe and 20% sulphur was briquetted with a small proportion of non-carbonaceous binder, as in Example I, and this material was then introduced into a preheated shaft furnace at the rate of 10 lbs. per hour, while chlorine was introduced at the base of the shaft at a rate of 10 lbs. per hour. The temperature of the reacting mass was maintained at 900° C. to 1000° C. over a period of many hours without external application of heat. The vaporized chlorides were collected and fractionally condensed. An ash containing less than 2% Sn and less than 5% Fe was recovered, the conversion of tin to tin chloride approximating 99% and the conversion of iron to iron chloride approximating 96%.

While the present invention has been described with particular reference to the use of chlorine as the chlorination agent other gaseous chlorinating agent such as HCl, phosgene or carbon tetrachloride may be used in conjunction with the chlorine for many purposes. In similar manner certain highly reactive ores may be treated using these chlorinating agents without the use of chlorine. In such cases it is often possible to secure formation of stannic chloride which is formed and volatilized leaving ferrous chloride in the residue. Likewise, these agents may be used in conjunction with oxygen to minimize formation of iron chloride.

Although the present invention has been described with reference to specific details of certain embodiments thereof, it is not intended that such details shall be regarded as limitations upon the scope of the invention except insofar as included in the accompanying claims.

I claim:

1. A continuous method of chlorinating a tin oxide bearing ore which comprises chlorinating a pervious bed containing said ore with a gaseous chlorinating agent in a reaction zone within a reactor and introducing ore, reducing agent, and the chlorinating agent therein at such a rate that sufficient heat is evolved to maintain the temperature not less than 500° C. within at least a portion of the zone without externally heating said reactor, the amount of chlorinating agent being sufficient to cause formation and volatilization of stannic chloride.

2. A continuous method of chlorinating a tin oxide bearing ore which comprises chlorinating a pervious bed containing said ore in a reaction zone within a reactor and introducing ore, oxygen and the chlorinating agent therein at such a rate that sufficient heat is evolved to maintain the temperature not less than 500° C. within at least a portion of the zone without externally heating said reactor.

3. A continuous method of chlorinating a tin oxide bearing ore which comprises chlorinating a pervious bed containing said ore with a gaseous chlorinating agent in a reaction zone within a reactor and introducing ore, carbonaceous material, oxygen and the chlorinating agent therein at such a rate that sufficient heat is evolved to maintain the temperature not less than 500° C. within at least a portion of the zone without externally heating said reactor.

4. A continuous method of chlorinating a tin oxide bearing ore which comprises chlorinating a pervious bed containing said ore in a reaction zone within a reactor and introducing ore, carbonaceous material and the chlorinating agent therein at such a rate that sufficient heat is evolved to maintain the temperature not less than 500° C. within at least a portion of the zone without externally heating the reactor.

5. A continuous method of chlorinating a tin oxide bearing ore which comprises chlorinating a pervious bed containing said ore in a reaction zone within a reactor and introducing ore, carbonaceous material and the chlorinating agent therein at such a rate that sufficient heat is evolved to maintain the temperature not less than 800° C. within at least a portion of the zone without externally heating said reactor.

6. A method of chlorinating a tin oxide bearing ore which comprises mixing the ore with carbon, briquetting the mixture, heating the briquettes to a temperature of 600° C. to remove volatile hydrocarbons, chlorinating a pervious bed containing said briquettes in a reaction zone within a reactor and introducing briquettes and the chlorinating agent therein at such a rate that sufficient heat is evolved to maintain the temperature not less than 500° C. within at least a portion of the zone without externally heating said reactor.

7. A method of chlorinating a tin oxide ore which comprises forming a pervious bed of ore within a reactor, introducing a gaseous chlorinating agent into said bed and regulating the rate of introduction of said agent such that the temperature within a portion of said bed is maintained above 500° C. without externally heating the reactor, the amount of chlorination agent being sufficient to cause formation and vaporization of stannic chloride.

8. A method of chlorinating a tin oxide ore which comprises forming a pervious bed of ore within a reactor, introducing a gaseous chlorinating agent into said bed and regulating the rate of introduction of said agent such that the temperature within a portion of said bed is maintained above 800° C. without externally heating the reactor, the amount of chlorination agent being sufficient to cause formation and vaporization of stannic chloride.

9. A method of chlorinating a tin ore which comprises forming a pervious bed of ore within a reactor at least 12 inches deep and chlorinating said bed at a temperature of at least 500° C., the amount of chlorinating agent introduced being sufficient to cause formation and vaporization of stannic chloride.

10. A method of chlorinating a tin oxide ore which comprises forming a pervious bed of ore within a reactor at least 12 inches deep and chlorinating said bed at a temperature of at least 800° C., the amount of chlorinating agent introduced being sufficient to cause formation and vaporization of stannic chloride, and regulating the rate of introduction of ore and chlorine into said bed such that sufficient heat is evolved to maintain the temperature not less than 800° C. within at least a portion of the bed without externally heating the reactor.

11. A method of chlorinating a tin oxide ore which comprises forming a pervious bed of ore within a reactor at least 12 inches deep and chlorinating said bed at a temperature of at least 800° C., the amount of chlorinating agent introduced being sufficient to cause formation and vaporization of stannic chloride and maintaining the hottest portion of the bed at least about 6 inches below the top of the bed, and regulating the rate of introduction of ore and chlorine into said bed such that sufficient heat is evolved to maintain the temperature not less than 800° C. within at least a portion of the bed without externally heating the reactor.

12. A method of chlorinating a tin oxide ore which comprises forming a pervious bed of ore within a reactor at least 12 inches deep and chlorinating said bed at a temperature of at least 800° C., the amount of chlorinating agent introduced being sufficient to cause formation and vaporization of stannic chloride, and regulating the rate of introduction of ore, carbonaceous material, and chlorine into said bed such that sufficient heat is evolved to maintain the temperature not less than 800° C. within at least a portion of the bed without externally heating the reactor.

13. A method of chlorinating a tin oxide ore which comprises forming a pervious bed of ore within a reactor at least 12 inches deep and chlorinating said bed at a temperature of at least 800° C., the amount of chlorinating agent introduced being sufficient to cause formation and vaporization of stannic chloride, and regulating the rate of introduction of ore, carbonaceous material, oxygen and chlorine into said bed such that sufficient heat is evolved to maintain the temperature not less than 800° C. within at least a portion of the bed without externally heating the reactor.

14. A continuous method of chlorinating a tin oxide bearing ore which comprises chlorinating a pervious bed containing said ore with a gaseous chlorinating agent in a reaction zone within a reactor and introducing ore, carbonaceous material, oxygen and the chlorinating agent therein at such a rate that sufficient heat is evolved to maintain the temperature not less than 500° C. within at least a portion of the zone without externally heating said reactor, the amount of chlorinating agent being sufficient to cause formation and vaporization of stannic chloride.

15. A method of chlorinating a tin oxide ore which comprises forming a pervious bed of ore and carbonaceous material within a reactor at least 12 inches deep and chlorinating said bed at a temperature of at least 500° C., the amount of chlorinating agent introduced being sufficient to cause formation and vaporization of stannic chloride.

16. A method of chlorinating a tin oxide ore which comprises forming a pervious bed of ore and carbonaceous material within a reactor at least 24 inches deep and chlorinating said bed at a temperature of at least 500° C., the amount of chlorinating agent introduced being sufficient to cause formation and vaporization of stannic chloride and maintaining the hottest portion of the bed at least about 6 inches below the top of the bed.

17. A method of chlorinating a tin oxide ore which comprises forming a pervious bed of ore and carbonaceous material within a reactor at least 12 inches deep and chlorinating said bed at a temperature of at least 500° C., the amount of chlorinating agent introduced being sufficient to cause formation and vaporization of stannic chloride and maintaining the hottest portion of the bed at least 6 inches below the top of the bed, and regulating the rate of introduction of ore, carbonaceous material, and chlorine into said bed such that sufficient heat is evolved to maintain the temperature not less than 500° C. within at least a portion of the bed without externally heating the reactor.

IRVING E. MUSKAT.